Figure 1:
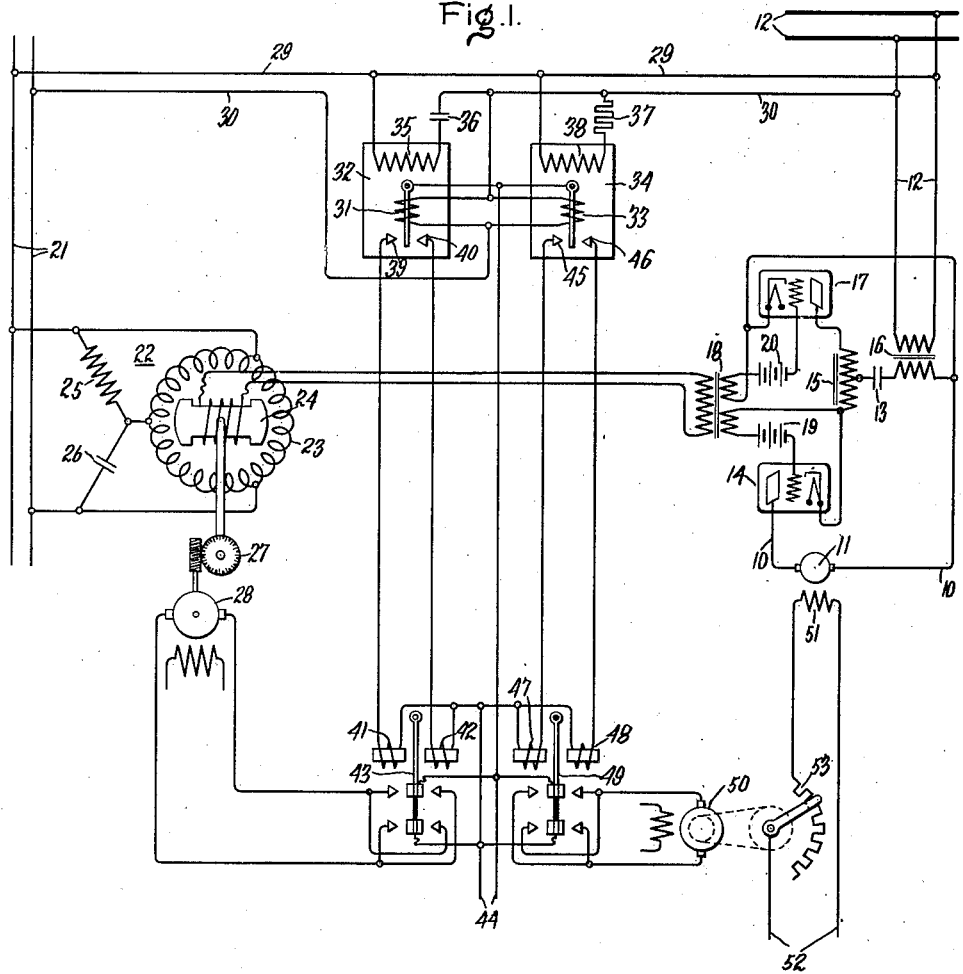

Patented July 4, 1933

1,917,107

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

ELECTRIC POWER CONVERTING APPARATUS

Application filed January 12, 1931. Serial No. 508,160.

My invention relates to electric power converting apparatus and more particularly to such apparatus for converting direct current into alternating current, or alternating current of one frequency into an alternating current of another frequency.

Heretofore there have been devised various apparatus including electric valves for converting direct current into alternating current, known in the art as inverters, and apparatus for converting alternating current of one frequency into alternating current of another frequency, known in the art as frequency changers. In the arrangements of the prior art, however, both the potential and the phase relation of the potential of the receiving circuit are determined by those of the supply circuit and by the circuit constants of the power converting apparatus as well as by the load on the receiving circuit, and have been subject to considerable fluctuation under different operating conditions of the receiving circuit. It often becomes desirable, however, that the alternating current output of the power converting apparatus shall reproduce in phase relation and potential the alternating current of a low power circuit, for example, that derived from a capacitance transformer, the apparatus comprising in effect a power amplifier having any desired ratio of amplification.

It is an object of my invention, therefore, to provide an improved electric power converting apparatus, including electric valves, in which the alternating current output of the apparatus will reproduce in potential and phase relation the alternating current of a given alternating current circuit.

It is a further object of my invention to provide an improved electric power converting apparatus, including electric valves, which will convert electric energy of one frequency into electric energy of another frequency, the frequency, the potential, and the phase relationship of which are made to correspond to the same characteristics of a third alternating current circuit.

It is a further object of my invention to provide an improved electric power converting apparatus for converting direct current into alternating current, the potential and phase relation of which is made to correspond to that of a second alternating current circuit, in which there are no moving parts or contacts.

In accordance with my invention, the alternating current output of a power converting apparatus including electric valves, is compared with that of the controlling alternating current circuit, which is used to excite the control grids of the electric valves. This comparing circuit comprises a differential circuit together with relay means responsive to a difference in the potentials of the two circuits. The differential potential relay means is adapted to control an apparatus for varying the potential of the direct current supplied to the power converting apparatus so as to maintan the potental of the output circuit equal to or proportional to that of the controlling alternating current circuit. A phase shifting arrangement controlled by a phase responsive relay, also included in the differential circuit, is inserted between the alternating current controlling circuit and the grid circuits of the electric valves of the power converting apparatus, to maintain the potential of the output circuit of the apparatus in phase with that of the controlling circuit.

Figure 2:
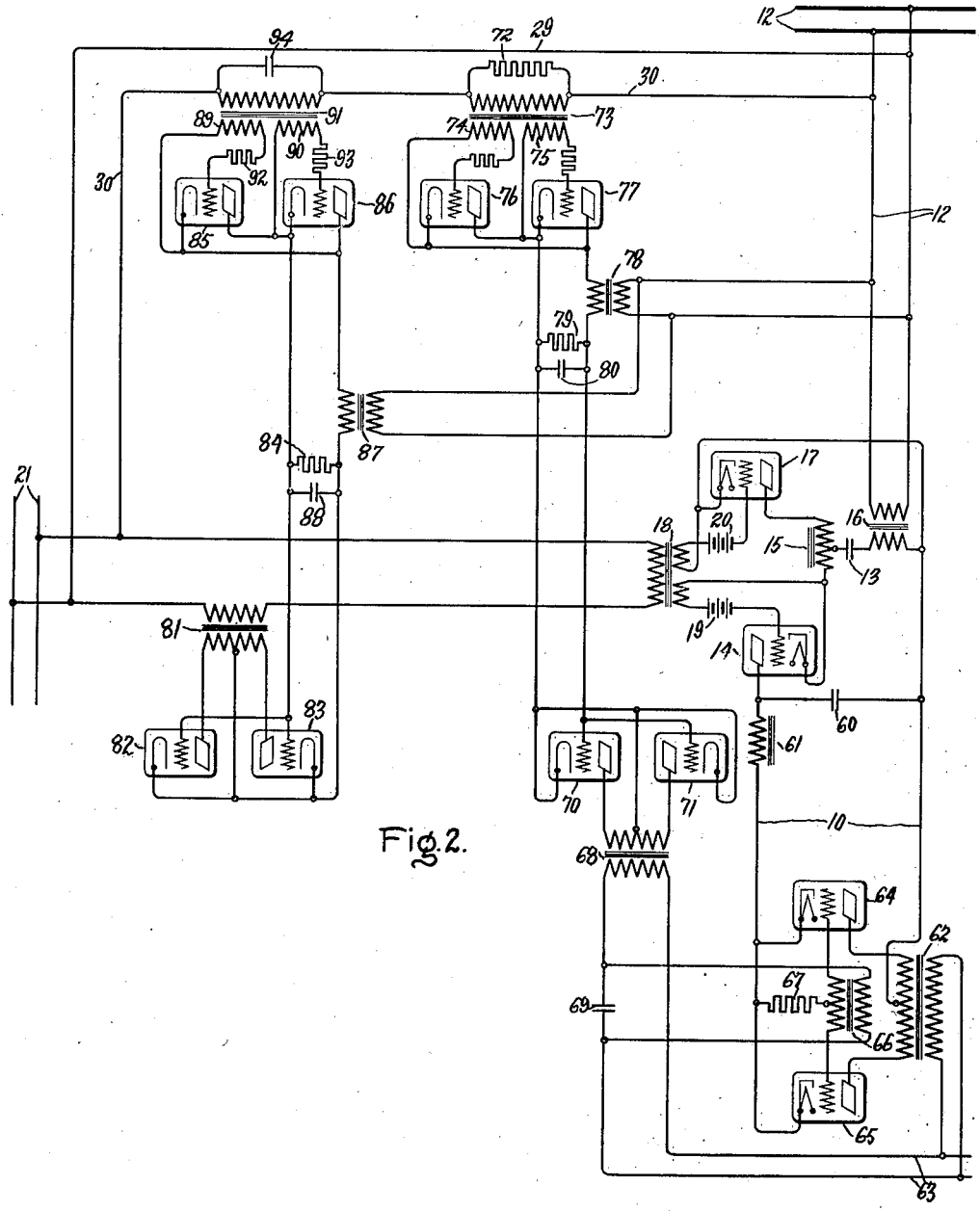

For a better understanding of my invention, together with other and further objects thereof, reference is had to the following description taken in connection with the accompanying drawings and its scope will be pointed out in the appended claims. Fig. 1 of the accompanying drawings illustrates my invention as applied to an electro-mechanical system for maintaining the potential and phase relation of the alternating current output of a power converting apparatus in correspondence with that of an alternating current controlling circuit, while Fig. 2 illustrates an all-electric modification of the invention as shown in Fig. 1 in which there are no moving parts or contacts.

Referring more particularly to Fig. 1, I have illustrated an arrangement for receiving direct current energy from a circuit 10, shown as energized from a direct current generator 11, converting it into alternating current and delivering it to a receiving circuit 12. This apparatus may be of any of the several types, including electric valves, well known in the art, though I have shown by way of example that type of apparatus known in the art as a series inverter and described and claimed in my Patent 1,752,247. This apparatus includes a capacitor 13, a circuit for charging the capacitor 13 from the direct current circuit 10, comprising an electric valve 14, the lower half of a reactor 15, and the primary winding of a power transformer 16, the secondary winding of which is connected to the receiving circuit 12, and a discharge circuit for the capacitor 13 comprising the upper half of reactor 15, an electric valve 17 and the primary winding of the power transformer 16. The electric valves 14 and 17 are each provided with an anode, a cathode, and a control grid and may be of any of the several types well known in the art although I prefer to use valves of the vapor electric discharge type in which the starting of current in the valve is determined by the potential on its control grid, but in which the current through the valve may be interrupted only by reducing its anode potential below its critical value. The grids of electric valves 14 and 17 are provided with excitation circuits including oppositely connected secondary windings of a grid transformer 18 and negative bias batteries 19 and 20 respectively. The primary winding of the grid transformer 18 is energized from an alternating current control circuit 21 through a phase shifting arrangement 22. This phase shifting arrangement is shown as comprising a polyphase primary winding 23, energized from the control circuit 21 through a phase splitting circuit made up of a reactor 25 and a capacitor 26, and a co-operating rotatable secondary member 24 to which the primary winding of the grid transformer 18 is directly connected, although any well known phase shifting arrangement may be substituted therefor without departing from my invention. The position of the rotatable secondary member 24 is determined by a gear mechanism 27 driven by a direct current motor 28.

In order to control the phase relation and the potential of the current delivered to the receiving circuit 12 in accordance with the potential of the control circuit 21, a differential circuit comprising conductors 29 and 30 is connected between the load circuit 12 and the control circuit 21. Connected in series with the conductor 30, is the current winding 31 of a phase differential relay 32 and the current winding 33 of a voltage differential relay 34. The relay 32 is provided with a potential winding 35 connected across the circuit 12 through a phase advancing capacitor 36, while the relay 34 is provided with a potential winding 38 connected across the main circuit through a resistor 37. The relay 32 is provided with contacts 39 and 40 for controlling the operating coils 41 and 42, respectively, of a reversing switch 43, which serves to connect the direct current motor 28 across a suitable source of direct current 44. Similarly the relay 34 is provided with contacts 45 and 46 adapted to control the operating coils 47 and 48, respectively, of a reversing switch 49 which serves to connect a direct current pilot motor 50 across the circuit 44. The generator 11 which supplies direct current to the power converting apparatus is shown as provided with a field winding 51 which is energized from a suitable source of direct current 52 through a rheostat 53 driven by the pilot motor 50, although it will be obvious to those skilled in the art that the power converting apparatus may be energized directly from the circuit 52 through the rheostat 53, if desired.

The general principle of operation of the power converting apparatus will be well understood by those skilled in the art or may be found explained in detail in Patent No. 1,752,247, mentioned above. In brief, the capacitor 13 is first charged through electric valve 14, this charging current sending a half cycle of alternating current through the power transformer 16. When the grid potential reverses polarity and electric valve 17 becomes conducting, capacitor 13 discharges through this valve, the discharge current flowing in an opposite direction through the power transformer 16, thus supplying the next successive half cycle of alternating current. This cycle of operation is repeated indefinitely. While the frequency of the current delivered by the power transformer 16 is determined by the frequency of the grid potential, i. e., by the frequency of the control circuit 21, the potential of the current delivered to the load circuit 12 is determined by the potential of the direct current circuit 10 and this potential as well as the phase relation between this potential and the potential of the control circuit 21 normally tends to fluctuate considerably with variations in the conditions of the load circuit. The operation of the above described apparatus to prevent this fluctuation of the phase and the potential of the current delivered to the load circuit 12 is as follows: Assume, for example, that, due to an increase in current drawn by the load circuit 12 or for any other cause, the potential of the load circuit tends to drop below that of the control circuit 21. Current will then flow in the differential circuit including the current winding 33 of relay 34. The potential winding of this relay is connected across the power circuit 12 through a resistor 37 to keep the current flowing in this potential winding substantially in phase with the potential of the load circuit 12. The relay 34 is of the power directional type well known in the art and, under the above conditions, will operate to close its right hand contact 46 thus energizing the operating coil 48 of the switch 49 from the direct current circuit 44. Switch 49 operates to connect the pilot motor 50 across the circuit 44 with such a polarity as to operate the rheostat 53 to decrease its resistance, thus increasing the excitation of the field winding 51 and the potential of the direct current circuit 10. When the potential of the circuit 12 reaches its normal value, i. e. becomes equal to that of the control circuits 21, the current winding 33 included in the differential circuit becomes deenergized, relay 34 assumes its neutral position and with it the reversing switch 49. Obviously, with an increase in the potential of the circuit 12 over that of the control circuit 21, the reverse operation takes place, relay 34 closing its contact 45 to operate the reversing switch 49 to its left hand position and reverse the operation of the motor operated rheostat.

If the potential of the circuit 12 becomes advanced in phase with respect to that of the control circuit 21, a current will flow in the differential circuits 29 and 30 but this current will be substantially in quadrature with the potentials of the control circuit 21 and the load circuit 12, and will lead or lag the potential of the load circuit 12 in accordance with whether the potential of this circuit leads or lags that of the circuit 21. Hence, with such a current flowing in the differential circuit, no torque will be exerted upon the armature of relay 34 since the current flowing in the two windings will be quadrature. However, the phase advancing capacitor 36, connected in series with the potential winding 35 of relay 32, causes the current in this potential winding to be substantially in quadrature with that of the load circuit 12. Hence, when a current flows in the differential winding 31, which is also in quadrature with that of the load circuit 12, a torque will be exerted upon the armature of this relay to close one of its contacts 39 or 40. Assume for example, that when the potential of the load circuit 12 leads that of the control circuit 21, the left hand contact 39 of relay 32 is closed to energize the operating coil 41 of reversing switch 43. The motor 28 is now connected across the direct current circuit 44 with such a polarity as to retard the phase of the potential applied to the primary winding of the grid transformer 18 with respect to the potential of the circuit 21. When the phase shifting mechanism 22 has operated to bring the potentials of the circuits 12 and 21 into coincidence, the relay 32 will become deenergized and assume its neutral position, as will the reversing switch 43, and the phase adjusting mechanism 22 will stop in this position. Obviously, if the potential of the circuit 12 tends to lag behind that of the control circuit 21, the reverse operation will take place. From the above it is seen that the potential of the load circuit 12 is maintained equal to that of control circuit 21 and that these two potentials are also maintained in phase coincidence.

Referring now to Fig. 2 there is illustrated an all-electric analogue to the arrangement shown in Fig. 1 in which all moving parts and contacts are eliminated. The electric power converting apparatus illustrated in this arrangement is similar to that shown in Fig. 1, but in this case the direct current circuit 10 is energized from a controlled full-wave rectifier provided with a smoothing capacitor 60 connected across the circuit and smoothing reactor 61 connected in series therewith. The controlled rectifier comprises a power transformer 62, the primary winding of which is connected to an alternating current supply circuit 63, and a pair of electric valves 64 and 65 each provided with an anode, a cathode and a control grid and preferably of the vapor electric discharge type. To control the output of the above described rectifier arrangement, the grids of the electric valves 64 and 65 are connected to the common cathode circuit through opposite halves of the secondary winding of a grid transformer 66 and a current limiting resistor 67. The primary winding of the grid transformer 66 is connected across one of the elements of an impedance phase shifting circuit comprising a series transformer 68 and a capacitor 69 connected in series across the alternating current supply circuit 63. The secondary winding of the transformer 68 is short circuited through a pair of electric valves 70 and 71 having the connections of a full-wave rectifier with the direct current circuit short circuited, thus giving the impedance of the transformer 68 a resistance characteristic. The valves 70 and 71 are preferably of the three electrode high vacuum pure electron discharge type.

In order to maintain a predetermined relation between the magnitude of the potential of the control circuit 21 and that of the load circuit 12, a differential circuit 29—30 similar to that of the arrangement of Fig. 1 is provided, with a resistor 72 serially connected in the circuit. The potential across resistor 72 is impressed upon the primary winding of a grid transformer 73 provided with a plurality of secondary windings. The secondary windings 74 and 75 of this transformer are connected to excite the control grids of a pair of electric valves 76 and 77 which are connected in parallel and in opposition in a series circuit made up of these valves, the secondary winding of a transformer 78, the primary winding of which is connected across the load circuit 12, and a resistor 79. A capacitor 80 is preferably connected in parallel to the resistor 79 to smooth out the ripples in its terminal potential due to the rectified current supplied by the valves 76 and 77. The valves 76 and 77 are preferably of the three electrode high vacuum pure electron discharge type. The control grids of electric valves 70 and 71, which serve to regulate the potential of the direct current supplied to the power converting apparatus by varying the phase of the grid potentials of electric valves 64 and 65, are excited in accordance with the potential across resistor 79.

In order to maintain a predetermined phase relation between the potentials of the control circuit 21 and the load circuit 12, there is provided an impedance device 81 having a primary winding connected in series with the primary winding of the grid transformer 18 and with a secondary winding short circuited through a pair of electric valves 82 and 83. These latter valves are also preferably of the high vacuum pure electron discharge type. The electric valves 82 and 83 are controlled by an arrangement exactly similar to that used for controlling the valves 70 and 71 in the potential control arrangement with the exception that, as in the arrangement shown in Fig. 1, the potential derived from the differential circuit 29—30 is shifted to a quadrature relation with the current flowing in the differential circuit. In brief, the control grids of the electric valves 82 and 83 are excited with potential across a resistor 84 which is included in a series circuit made up of a pair of electric valves 85 and 86 reversely connected in parallel, and the secondary winding of a transformer 87, the primary winding of which is energized from the load circuit 12. A smoothing capacitor 88 is connected across the resistor 84. The control grids of the valves 85 and 86 are energized from similarly connected secondary winding 89 and 90 of a grid transformer 91 through current limiting resistors 92 and 93 respectively. The primary winding of the grid transformer 91 is connected across a capacitor 94 included in the differential circuit 29—30 in series with the resistor 72.

In explaining the operation of the above described apparatus it will be assumed that initially the potentials of the control circuit 21 and the load circuit 12 are equal and in phase so that no current is flowing in the differential circuit 29—30 and the grid transformers 73 and 91 are deenergized. When the grid potentials of electric valves 76 and 77 are zero, the conductivities of these two valves are equal and the average potential across resistor 79 will be equal to zero, since the capacitor 80 is of such a value as to absorb potentials of the frequency of the power circuit. Consequently the grid potentials of electric valves 70 and 71 are also zero. It will be assumed that, with a zero grid potential, the conductivity of the valves 70 and 71 is such as to give the device 68 an effective resistance to maintain the proper phase relation between the grid potentials and the anode potentials of electric valves 64 and 65, so that the average direct potential delivered by this rectifier is just sufficient to produce the desired alternating potential in the load circuit 12. In case the potential of the load circuit 12 drops below that of the control circuit 21, due to an increase in the load on the circuit 12 or for any other cause, a current will flow in the differential circuit 29—30 which is substantially in phase with the potential of the load circuit 12. The grids of the valve 76 and 77 are oppositely connected to the secondary windings 74 and 75 of the grid transformer 73 so that, as a potential is impressed upon the primary winding of this transformer, an alternating potential will be impressed upon the control grids of these valves which is in phase with the anode potential of one valve but out of phase with anode potential of the other valve. The result is that the current passing through these valves will have unequal positive and negative half cycles and the unidirectional component of current flowing through resistor 79 will produce a potential which is impressed upon the grids of electric valves 70 and 71. Assume, for example, that, as the potential of the circuit 12 drops, the grid potential of electric valve 77 is in phase with its anode potential and that the direct current component flowing in the circuit including resistor 79 is of such a polarity as to produce a positive potential at the right hand terminal of resistor 79 with respect to its left hand terminal, i. e. such as to impress a positive potential upon the grids of electric valves 70 and 71 with respect to their cathodes. With a positive potential upon the grids of electric valves 70 and 71 their conductivity is increased and the effective resistance of the device 68 is decreased. This results in bringing the phase of the potential across capacitor 69 more nearly in phase with the potential of the circuit 63, i. e. in bringing the grid potentials of the valves 64 and 65 more nearly in phase with the anode potentials of these valves. The valves 64 and 65, which, it will be remembered, are preferably of the vapor electric discharge type, will become conductive at an earlier point in their respective half cycles and the average potential of the output of the rectifier will be increased so that the potential of the output of the power converting apparatus delivered to load circuit 12 will be correspondingly increased to restore the balance between the potentials of the load circuit 12 and the control circuit 21. Obviously, if the potential of the load circuit 12 rises above that of the control circuit 21, the reverse process will take place, i. e., the anode potential of electric valve 76 will be in phase with its anode potential, the polarity of the potential across resistor 79 will be reversed, the grids of electric valves 70 and 71 will be negative with respect to their cathodes, the effective resistance of the device 68 will be increased, the potential across the capacitor 69 will be retarded and the average output of electric valves 64 and 65 will be decreased to decrease the potential of the load circuit 12.

It will be obvious that, in case the potential of the load circuit 12 tends to become out of phase with that of control circuit 21, this tendency may be corrected by introducing a phase shift between the potential of the circuit 21 and that applied to the grid transformer 18 of the power converting apparatus in a direction opposite to that in which the potential of the circuit 12 tends to shift. Assume for example, that the potentials of the circuits 12 and 21 are equal in magnitude but that the potential of the circuit 12 tends to lag behind that of the circuit 21. It will be apparent to those skilled in the art that a current will now flow in the differential circuit 29—30 which will be approximately in quadrature with the potentials of the circuits 12 and 21 and that this current will produce a potential across capacitor 94 which is either in phase or in phase opposition with these potentials. That is, the grid potentials of the valves 85 and 86 are at all times in phase with the anode potential of one of the valves and in phase opposition to the anode potential of the other valve and the relation of these potentials is reversed as the potentials of the circuits 12 and 21 pass through phase coincidence. The operation of the above described apparatus to control electric valves 82 and 83 is identical with that described in connection with the apparatus for controlling the valves 70 and 71. Under the assumed condition the conductivity of the electric valves 82 and 83 will be increased so that the impedance of the device 81 is decreased to advance the phase of potential applied to the grid transformer 18 of the power converting apparatus and to bring the potential of the load circuit 12 in phase with that of the circuit 21. It will be obvious that, in case the potential of the circuit 12 should tend to lead that of the control circuit 21, the reverse operation will take place.

It should be noted that, when the potentials of the circuits 12 and 21 are in phase but when one is of a greater amplitude than the other, the potential across the capacitor 94 will be in quadrature with the potentials of these circuits as will be the grid potentials of the valves 85 and 86. Under these conditions the conductivities of the valves 85 and 86 are equal so that the potential across the resistor 84 has no unidirectional component and the grids of the valves 82 and 83 will be at cathode potential. That is, as long as the potentials of the circuits 12 and 21 are in phase, a variation in the magnitude of these potentials will not affect the phase shifting device 81. Similarly, a variation in the phase of the potentials of circuits 12 and 21 will have no effect on the potential responsive circuit.

While I have described what I at present consider preferred embodiments of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is,—

1. In combination, an apparatus for converting direct current into alternating current including an electric valve provided with a control grid, an independent source of alternating potential for exciting said grid, and means for maintaining a predetermined relation between the magnitude of said grid potential and that of the alternating current output of said apparatus.

2. In combination, an apparatus for converting direct current into alternating current including an electric valve provided with a control grid, an independent source of alternating potential for exciting said grid, and means for maintaining a predetermined phase relation between the grid potential and that of the alternating current output of the apparatus.

3. In combination, an apparatus for converting direct current into alternating current including an electric valve provided with a control grid, an independent source of alternating potential for exciting said grid, and means for maintaining a predetermined relation between the phase and magnitude of said grid potential and that of the alternating current output of the apparatus.

4. In combination a source of direct current of variable potential, a power converting apparatus for converting said direct current into alternating current including an electric valve provided with a control grid, a source of alternating potential for exciting said control grid, means responsive to the difference between the magnitude of said grid potential and that of the alternating current output of said apparatus, and means controlled by said differential means for varying the potential of said direct current circuit.

5. In combination, a source of direct current of variable potential, a power converting apparatus for converting said direct current into alternating current including an electric valve provided with a control grid, a source of alternating potential for exciting said control grid, a differential potential relay connected between said source of grid potential and the alternating current side of said apparatus, and means controlled by said relay for varying the potential of said direct current circuit to maintain the potentials of the two alternating current circuits equal.

6. In combination, a source of direct current, a power converting apparatus for converting said direct current into alternating current including an electric valve provided with a control grid, a source of alternating grid potential, a phase shifting circuit interposed between said source and said grid, means responsive to a phase displacement between the potential of the alternating current circuit and said grid potential, and means controlled by said phase responsive means for controlling said phase shifting circuit.

7. In combination, a source of direct current, a power converting apparatus for converting said direct current into alternating current including an electric valve provided with a control grid, a source of alternating grid potential, a phase shifting circuit interposed between said source and said grid, a differential phase relay connected between said source of grid potential and the alternating current side of said apparatus, and means controlled by said relay for controlling said phase shifting circuit to maintain the potentials of the two alternating current circuits in phase coincidence.

8. In combination, an apparatus for converting direct current into alternating current including an electric valve provided with a control grid, a source of alternating potential for exciting said grid, and electric valve means for maintaining a predetermined relation between the magnitude of said potential and that of the alternating current output of the apparatus.

9. In combination, a source of direct current of variable potential, a power converting apparatus for converting said direct current into alternating current including an electric valve provided with a control grid, a source of alternating potential for exciting said control grid, a second electric valve provided with a control grid, a circuit for energizing said last mentioned grid in accordance with the difference between the magnitude of the potential of said alternating current source and that of the alternating current output of the apparatus, and means controlled by said second valve for varying the potential of said direct current circuit.

10. In combination, a source of alternating current, a rectifier means including an electric valve provided with a control grid for converting said alternating current into direct current, an inverter including a second electric valve provided with a control grid for reconverting said direct current into alternating current of any desired frequency, a source of alternating potential for exciting the control grid of the inverter valve, a third electric valve provided with a control grid, a circuit for energizing the grid of said third valve in accordance with the difference between the magnitude of the potential of said alternating current source and that of the alternating current output of the inverter, and means controlled by said third valve for shifting the phase between the grid and anode potentials of said first valve to maintain the potentials of the two alternating current circuits equal.

11. In combination, an apparatus for converting direct current into alternating current including an electric valve provided with a control grid, a source of alternating potential for exciting said grid, and electric valve means for maintaining a predetermined phase relation between the grid potential and that of the alternating current output of the apparatus.

12. In combination, an apparatus for converting direct current into alternating current including an electric valve provided with a control grid, a source of alternating potential for exciting said grid, means for shifting the phase of said grid potential with respect to that of said source, a second electric valve provided with a control grid, a circuit for energizing the grid of said second valve in accordance with the phase displacement between the potential of said source and that of the alternating current output of the apparatus, and means controlled by said second valve for controlling said phase shifting means.

13. In combination, an apparatus for converting direct current into alternating current including an electric valve provided with a control grid, a source of alternating potential for exciting said grid, an impedance device connected between said source and said grid, a second electric valve provided with a control grid for varying said impedance, a third electric valve provided with a control grid, a circuit for energizing the grid of said third valve in accordance with the phase displacement between the potential of said source and that of the alternating current output of the apparatus, and a circuit including said third valve for controlling the grid potential of said second valve.

In witness whereof, I have hereunto set my hand this 2nd day of January, 1931.

ALAN S. FITZ GERALD.